US008083590B2

(12) United States Patent
Nourry

(10) Patent No.: US 8,083,590 B2
(45) Date of Patent: Dec. 27, 2011

(54) MULTIDIRECTIONAL ERGONOMIC CONTROL UNIT

(75) Inventor: Jean-François Nourry, Crécy la Chapelle (FR)

(73) Assignee: CoActive Technologies, LLC., Newton, MA (US)

( * ) Notice: Subject to any disclaimer, the term of this patent is extended or adjusted under 35 U.S.C. 154(b) by 919 days.

(21) Appl. No.: 12/046,686

(22) Filed: Mar. 12, 2008

(65) Prior Publication Data

US 2008/0227547 A1 Sep. 18, 2008

(30) Foreign Application Priority Data

Mar. 12, 2007 (FR) ..................................... 07 53758

(51) Int. Cl.
*G06F 17/00* (2006.01)

(52) U.S. Cl. ......................................................... 463/38

(58) Field of Classification Search .............. 463/36–38; 345/161
See application file for complete search history.

(56) References Cited

U.S. PATENT DOCUMENTS 4,841,790 A * 6/1989 Williston et al. ......... 74/388 PS
2002/0011126 A1* 1/2002 Christopher ................. 74/89.23
2005/0200218 A1* 9/2005 Fremerey et al. ............ 310/90.5
2010/0124468 A1* 5/2010 Gast et al. ..................... 409/232

FOREIGN PATENT DOCUMENTS

EP 1 524 579 A 4/2005
EP 1 524 680 A 4/2005
EP 1 750 195 A 2/2007

* cited by examiner

*Primary Examiner* — Ronald Laneau

(74) *Attorney, Agent, or Firm* — Pepper Hamilton LLP

(57) ABSTRACT

A multidirectional control unit includes a lower body of main axis A, an intermediate part which is mounted to move relative to the body in a radial plane, radial displacement guidance means for the intermediate part, a handle of secondary axis B, which is supported by the intermediate part and which is linked to it in radial displacement, between a neutral central position and a plurality of radial actuation positions. The handle may be mounted to slide axially on the secondary axis B, between a top idle axial position and a bottom active axial position. At least one electrical switch may be able to change state when the handle is displaced towards its bottom active axial position. The handle is mounted to rotate freely, about the secondary axis B, relative to the body of the multidirectional control unit.

9 Claims, 5 Drawing Sheets

MULTIDIRECTIONAL ERGONOMIC CONTROL UNIT

BACKGROUND

The invention relates to a multidirectional control unit.

SUMMARY

The embodiments described in this document relate to a multidirectional control unit which in some embodiments may include a lower body of main axis A; an intermediate part which is mounted to move relative to the body in a radial plane; and a radial displacement guidance means for the intermediate part, which cooperates with a first bottom radial face of the intermediate part and a second top radial face of the body. It also may include a handle of secondary axis B, which is supported by the intermediate part and which is linked to it in radial displacement, between a neutral central position in which the secondary axis of the handle extends roughly coaxially with the main axis of the body and a plurality of radial actuation positions, in each of which the secondary axis of the handle and the main axis of the body are parallel and radially offset from each other, the handle being mounted to slide axially on the secondary axis B, between a top idle axial position towards which the handle is elastically returned and a bottom active axial position. The unit also may include at least one electrical switch which is able to change state when the handle is displaced towards its bottom active axial position; and an elastically deformable bar which extends axially from the body. The bar may include a top head that cooperates with the handle, and which supports at least one strain gauge, such that the bar is able to bend when the handle is driven in radial displacement for said at least one gauge to produce an electrical signal representative of said radial displacement of the handle.

Other characteristics and advantages of the invention will become apparent from reading the detailed description which follows, for an understanding of which the reader should refer to the appended figures in which:

DETAILED DESCRIPTION

Figure 1:
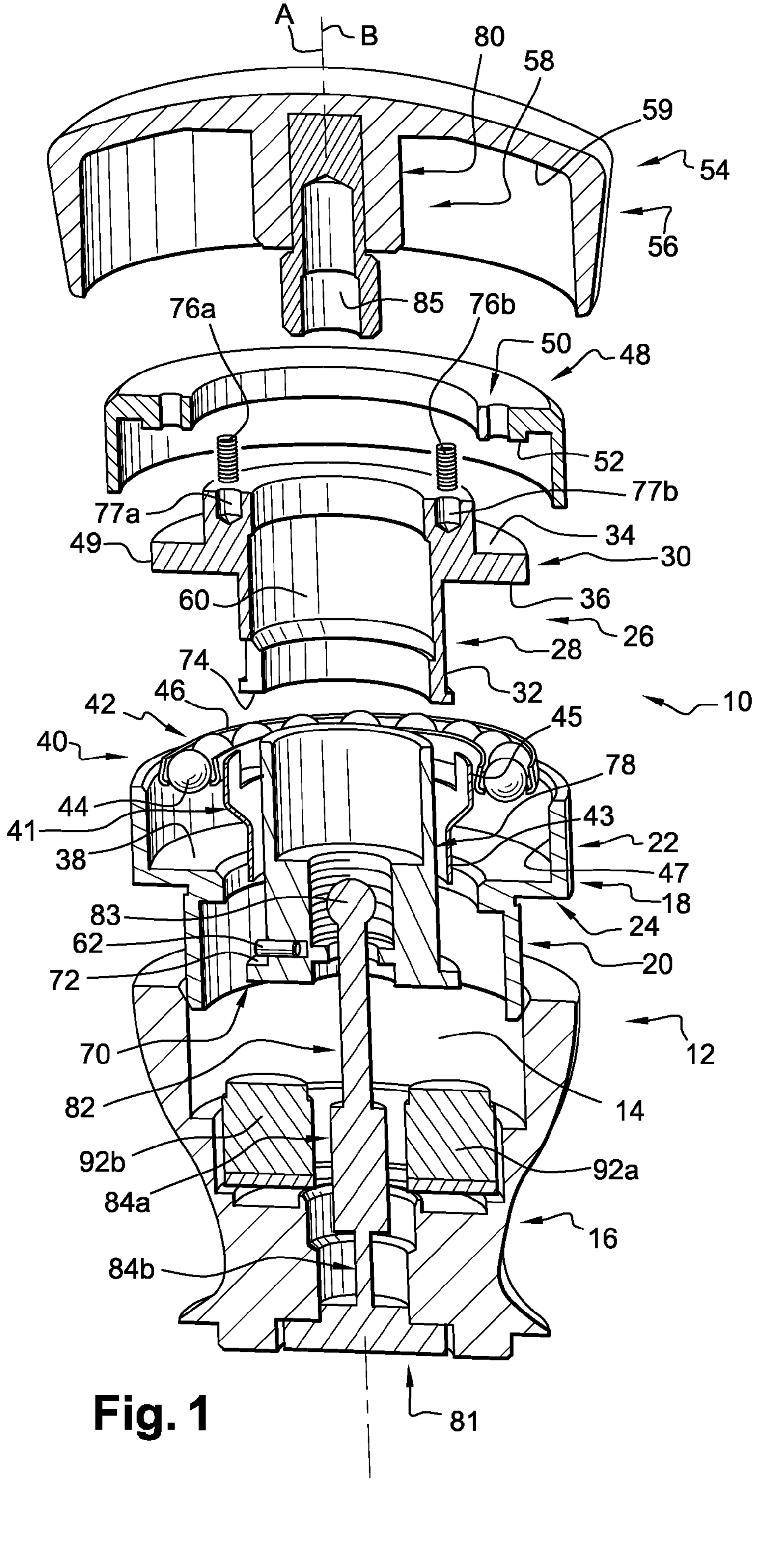
FIG. 1 is an exploded perspective view in axial cross section which illustrates a multidirectional control unit equipped with an upper handle mounted to move relative to the body of the multidirectional control unit.

For the description of the invention, and the clarity of the claims, the vertical, longitudinal and transversal orientations will be adopted in a nonlimiting way according to the V, L, T marking indicated in the figures, the vertical direction corresponding to the vertical orientation of FIG. 1, with no reference to the Earth's gravity.

The terms top, bottom, upper and lower will also be adopted with reference to the vertical orientation of FIG. 1.

In the description that follows, identical, similar or analogous elements are denoted by the same reference numerals.

There are numerous multidirectional control units called "joysticks", which are used in various applications, such as for example, to control one or more accessories, such as a motorized bed of a scanner or of a radiography device for medical applications.

A multidirectional control unit of this type is known, which includes a lower axial body and an upper manual actuation device, or operating handle, which is mounted to slide radially relative to the body between an idle position centered relative to the body and a plurality of radial actuation positions. The multidirectional control unit includes an elastically deformable bar which extends axially from the body, which includes a top head cooperating with the handle, and which supports, for example, two strain gauges, also called deformation gauges, arranged at right angles to each other. Thus, each gauge is able to produce an electrical signal representative of the radial displacement of the handle according to the bending of the associated bar. The gauges each transmit a signal to an electronic processing device which makes it possible to control actuators to displace a moving unit.

Furthermore, depending on the design of this multidirectional control unit of the prior art, the upper handle may be mounted to slide axially between a top idle axial position and a bottom active axial position in which the handle is able to activate an electrical switch, which is associated with the control of another function. However, the user has to move around the multidirectional control unit while operating the latter, in order, for example, to visually check the displacement of the bed from various angles. The handle of the multidirectional control unit is linked to rotate relative to the body, such that the user must release the handle if he does not want to twist his wrist when he moves around the multidirectional control unit.

The embodiments described in this document propose a multidirectional control unit with enhanced ergonomics and which enables the user to limit the movements of his arm and of his wrist when he acts on the handle.

To this end, the embodiments propose a multidirectional control unit such as that of the type described previously, characterized in that the handle is mounted to rotate freely, about the secondary axis B, relative to the body of the multidirectional control unit.

According to other characteristics, the handle may be linked to rotate with the intermediate part, and the radial displacement guidance means of the intermediate part may be able to guide the handle in rotation, about the secondary axis. The radial displacement guidance means may include at least one first set of balls, of which each ball is axially inserted between the first bottom radial face of the intermediate part and the second top radial face of the body. The radial displacement guidance means also may include a first circular cage in which the balls of the first set are fitted to rotate and distributed angularly about the secondary axis of the handle.

The multidirectional control unit may include a means of returning the guidance means to a centered position, on the secondary axis of the handle.

The intermediate part may include an annular radial plate which is axially delimited by said first bottom radial face of the intermediate part and by a third top radial face. The radial displacement guidance means may include a second set of any number of balls, each ball being axially inserted between said third top radial face of the intermediate part and a fourth bottom radial face of the body. The body may include an internal, optionally concave and/or cylindrical, axial end-stop wall which is arranged facing a convex cylindrical axial wall of the intermediate part, so as to limit the radial displacement of the handle relative to the body.

The switch may be supported by the body of the multidirectional control unit. The head of the bar may be received by sliding axially into a cylindrical housing which extends axially on the secondary axis of the handle.

FIG. 1 represents a multidirectional control unit 10, also called "joystick", which enables a user to control an appliance (not represented), for example a motorized bed of a medical radiography device (not represented).

The multidirectional control unit 10 includes a lower body 12 of vertical main axis A, via which the multidirectional control unit 10 is, for example, mounted on a radiography device control console (not represented).

The lower body 12 is of cylindrical of revolution form, about the main axis A, delimiting a cylindrical axial internal orifice 14.

The lower body 12 includes a lower support 16 in which is fixed a complementary upper cylindrical seat 18. The seat 18 is fixed here by screws into the body 12.

The seat 18 of the lower body 12 includes a radial shoulder 24 from which extends downwards a first lower axial cylindrical portion 20 which is fixed in the lower body 12 and towards the top, a second upper axial cylindrical portion 22, having a diameter greater than that of the first portion 20.

The seat 18 receives an intermediate part 26, cylindrical of revolution about a vertical secondary axis B.

The intermediate part 26 supports an upper manual actuation device or handle 54 for guiding the latter in displacement relative to the lower body 12.

The intermediate part 26 may take the form of a cylindrical axial section 28 and an annular guidance radial plate 30 which extends from an external concave face 32 of the axial section 28.

In some embodiments, the guidance radial plate 30 may take the form of a collar and may be axially delimited by a top radial face 34 and a bottom radial face 36.

The intermediate part 26 may be mounted to move relative to the lower body 12 in a radial plane, on guidance means 40.

The guidance means 40 includes a set 42 of any number of balls 44, each ball 44 of which is axially inserted between the bottom radial face 36 of the guidance radial plate 30 and a top radial face 38 of the radial shoulder 24 of the seat 18.

The balls 44 are mounted to rotate in an optionally circular cage 46 and they are here angularly distributed in a regular manner about the secondary axis B.

Such a design of the guidance means 40 enables the intermediate part 26 to rotate about the secondary axis B and to slide radially in an accurate way and with reduced friction.

Figure 3:
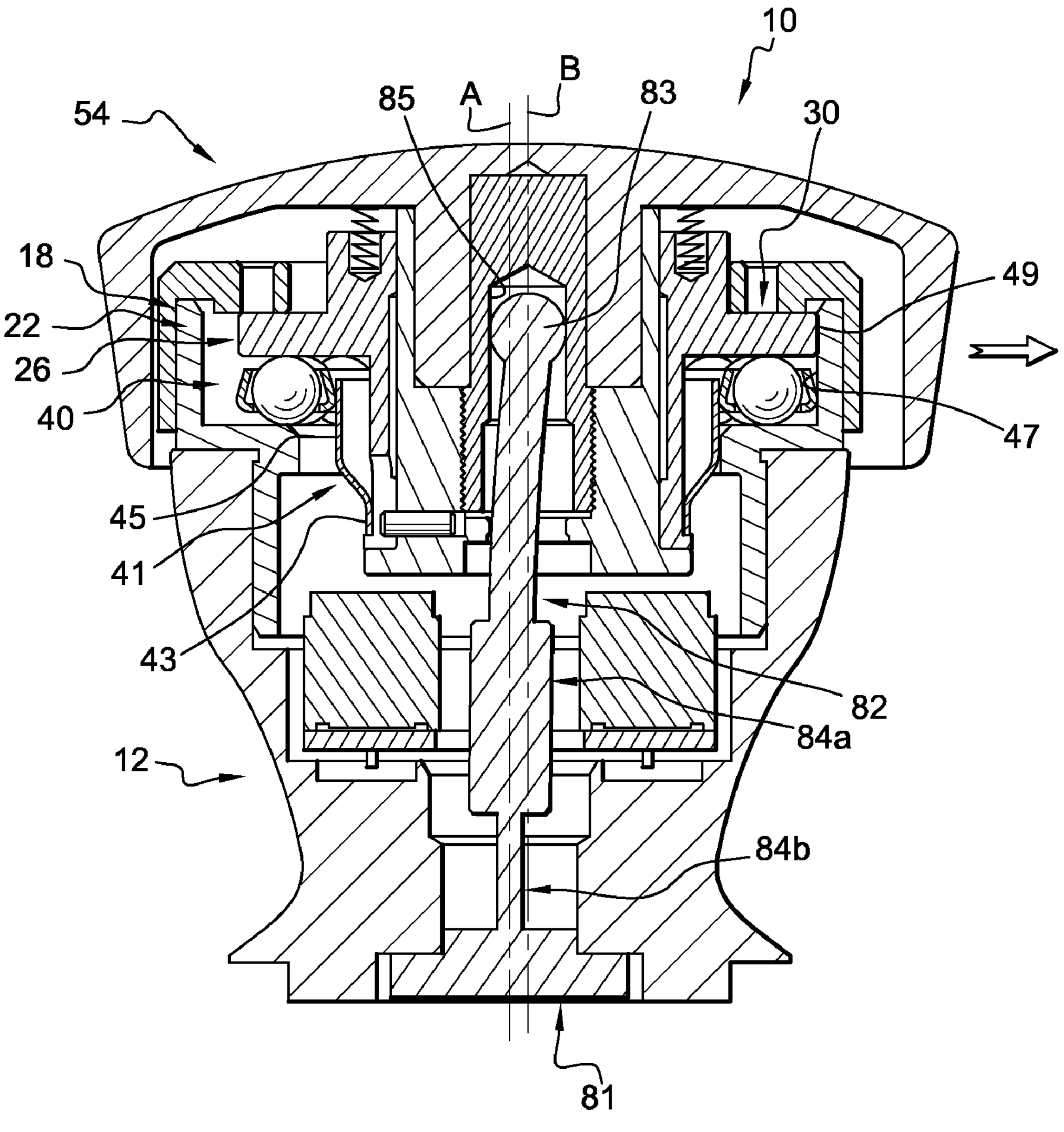
FIG. 3 is a view similar to that of FIG. 2, which illustrates the upper handle in a radial actuation position.

As can be seen in FIG. 3, the intermediate part 26 is limited in its radial displacements. To this end, the upper cylindrical portion 22 of the seat 18 may include an internal concave cylindrical axial end-stop wall 47 which is arranged facing a convex cylindrical axial wall 49 of the guidance radial plate 30.

The multidirectional control unit 10 includes an elastic return means 41 of the guidance means 40, which is able to permanently stress the guidance means 40 into a centered position, on the secondary axis B. To this end, the elastic return means 41 is shown in this embodiment in the form of a tulip open upwards. In some embodiments, the elastic return means 41 means take the form of a lower ring 43 from which extends a plurality of return blades 45 upwards and radially outwards, which are angularly arranged regularly about the secondary axis B and which are each elastically deformable.

The lower ring 43 is fixed around the concave face 32 of the axial section 28 of the intermediate part 26. For example, the lower ring 43 initially may take the form of a strip of metal or other material which is elastically deformable and which is wound around the axial section 28 before being fixed.

Each return blade 45 cooperates by radial pressure with an internal concave face of the cage 46 with balls 44, so that the return blades 45 return the guidance means 40 elastically towards the secondary axis B.

The lower body 12 may include an annular capsule 48 which is open upwards and which is fitted in a fixed way around the upper cylindrical portion 22 of the seat 18, after the guidance means 40 and the intermediate part 26 have been fitted. The capsule 48 is in this case may be connected to the upper cylindrical portion 22 of the seat 18 by a weld or other connection.

The capsule 48 may include an upper annular radial portion 50, a bottom face 52 of which is bearing on the top radial face 34 of the radial guidance plate 30, in order to axially maintain the radial plate 30 in contact with the balls 44.

As a nonlimiting example the bottom face 52 and the top radial face 34 can delimit an axial play between them, in order to reduce or avoid friction between said faces while the intermediate part 26 is being radially displaced.

The upper handle 54, supported by the intermediate part 26, may take the form of a bell of revolution about the vertical secondary axis B with its convex surface oriented upwards, that the user grasps to manipulate the multidirectional control unit 10.

The handle 54 caps the multidirectional control unit 10 and may include a peripheral cylindrical portion or skirt 56 which may extend downwards, concealing at least a portion of the capsule 48 and an upper part of the lower body 12, in particular to prevent the ingress of polluting elements into the multidirectional control unit 10.

Figure 2:
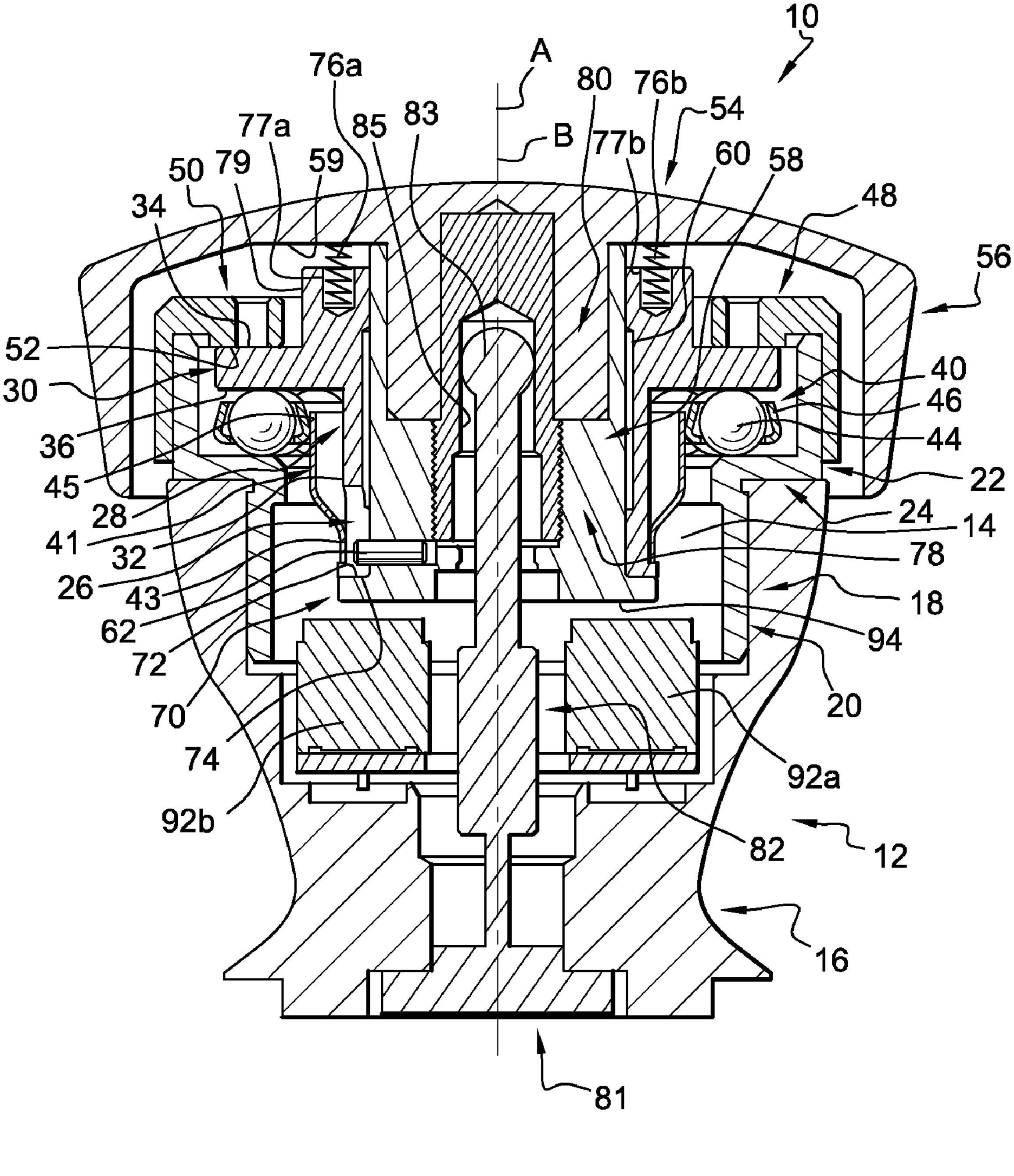
FIG. 2 is an axial cross-sectional view which illustrates the multidirectional control unit of FIG. 1, the handle of which occupies a neutral central position.

The handle 54 may be mounted to move between a neutral central position, represented in FIG. 2, in which the secondary axis B of the handle 54 extends roughly coaxially with the main axis A of the lower body 12, and a plurality of radial actuation positions, one of which is represented in FIG. 3, and in each of which the secondary axis B of the handle 54 and the main axis A of the lower body 12 are parallel and radially offset from each other.

Figure 4:
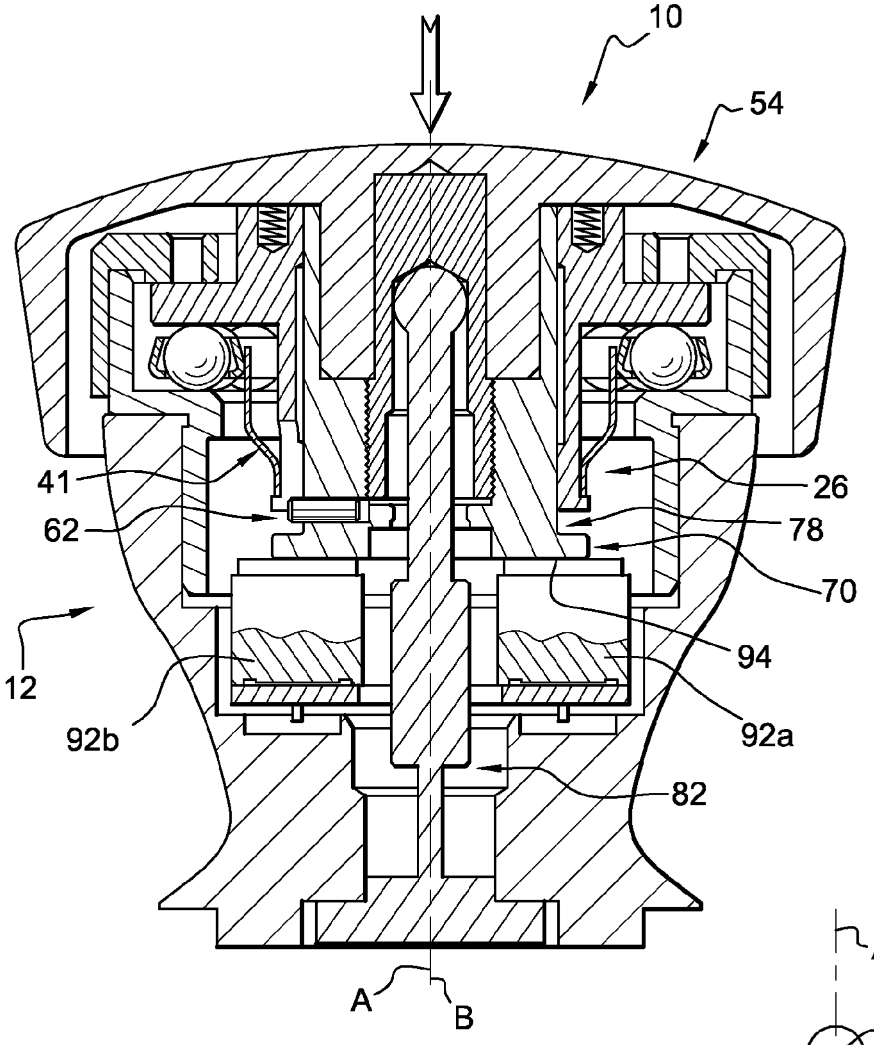
FIG. 4 is a view similar to that of FIG. 2, which illustrates the upper handle in a bottom active axial position.

Furthermore, the handle 54 may be mounted to slide axially on the secondary axis B, between a top idle axial position towards which the handle 54 is elastically returned and a bottom active axial position, represented in FIG. 4.

To this end, the handle 54 may include a cylindrical or other shaped internal section 58 which extends axially downwards on the vertical secondary axis B from an internal radial face 59 of the handle 54.

The internal section 58 may be mounted to slide axially in an axial bore 60 complementing the axial section 28 of the intermediate part 26, on the secondary axis B.

The handle 54 and the intermediate part 26 are in this embodiment linked in rotation on the secondary axis B by means of a pin 62.

To this end, the pin 62 may project radially outwards from the internal section 58 of the handle 54 to an opening 66 which extends axially into the wall 68 of the axial section 28 of the intermediate part 26.

Furthermore, the lower end of the internal section 58 may include an annular collar 70 which projects radially from the external convex face 64 of the intermediate part 26.

The collar 70 may include a top face 72 which bears against an edge 74 of the bottom end of the axial section 28 of the intermediate part 26, when the handle 54 occupies its top idle axial position.

The internal section 58 of the handle 54 may, in this embodiment be made in two parts. It may include a first removable part 78 which is fixed, in this case by screw fastening, to a second complementary fixed part 80, in order to enable the intermediate part 26 to be mounted on the internal section 58 of the handle 54.

Figure 5:
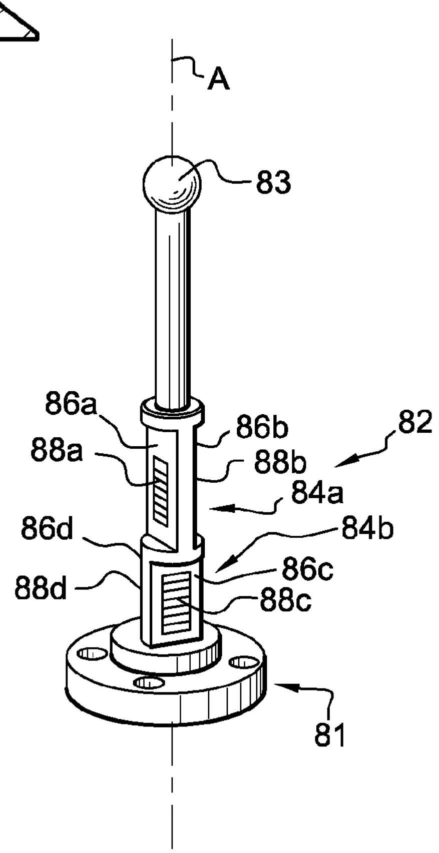
FIG. 5 is a perspective view which represents an elastically deformable bar which cooperates with the handle and which supports strain gauges.

FIG. 5 represents an elastically deformable bar 82 which extends vertically upwards on the main axis A and which constitutes the elastic means for returning the handle 54 to its neutral central position.

The bar 82 may extend axially from a foot 81 which is fixed to the lower body 12 to a top head 83.

The top head 83 may be spherical overall and may be mounted to slide axially in an axial cylindrical sleeve 85 of the internal section 58 of the handle 54.

The bar 82 may include a first median section 84*a* which is delimited by two first parallel axial flats 86*a* and 86*h*.

Similarly, the bar 82 may include a second lower section 84*b* which is delimited by two second parallel axial flats 86*e* and 86*d*, the first two flats 86*a*, 86*b* being angularly offset by 90° (about the main axis A) relative to the second two flats 86*c*, 86*d*.

In an axially symmetrical way, each of the flats 86*a*, 86*b*, 86*c*, 86*d* may support a strain gauge 88*a*, 88*b*, 88*c*, 88*d*, respectively, each of which may be electrically connected to an electronic processing device (not represented).

Thus, when the handle 54 is driven in radial displacement by the user into one of its radial actuation positions, as illustrated in FIG. 3, the handle 54 applies bending stress to the bar 82, causing the strain gauges 88*a*, 88*b*, 88*c*, 88*d* to be deformed and each transmit an electrical signal to the processing device, which is representative of the deformation of the bar 82.

The processing device controls, for example, a first motor (not represented) to drive the bed in a first direction and a second motor (not represented) to drive the bed in a second direction, which is, for example, orthogonal to the first direction.

Thus, the displacement of the bed corresponds, in an amplified way, to the small radial displacement of the handle 54.

Furthermore, the processing device is able to control the speed of displacement of the bed according to the amplitude of the radial displacement of the handle 54 relative to its central neutral idle position, or, in other words, according to the radial force exerted on the handle 54 by the user.

Also, the multidirectional control unit 10 includes one, two or more electrical switches 92*a*, 92*b*, each of which is fixed to the lower body 12 either side of the vertical axis A, which are arranged below the internal section 58 of the handle 54 and each of which is electrically connected to the processing device.

Thus, when the handle 54 reaches its bottom active axial position illustrated in FIG. 4, a lower axial face 94 of the collar 70 bears axially on each of the two electrical switches 92*a*, 92*b*, which change state.

The two switches 92*a*, 92*b* are, for example, of the "all or nothing" type, and make it possible to control the on and off state of the multidirectional control unit 10. As a nonlimiting example, the two switches 92*a*, 92*b* can, for example, attain a number of active states during their displacements, states in each of which the two switches 92*a*, 92*b* are associated with the control of an action linked to the operation of the multidirectional control unit 10, of the bed or of a device associated with the multidirectional control unit.

Finally, the handle 54 is elastically returned to its top axial position by means of a first spring 76*a* and a second return spring 76*b* which are helical in shape, Each spring 76*a*, 76*b* is here inserted axially between the handle 54 and the intermediate part 26. Each spring 76*a*, 76*b* may include a first bottom end which is arranged in a drill hole 77*a*, 77*b*, respectively formed in a top radial face 79 of the axial section 28 of the intermediate part 26 and a second top end which bears axially against the bottom face 59 of the handle 54.

Figure 6:
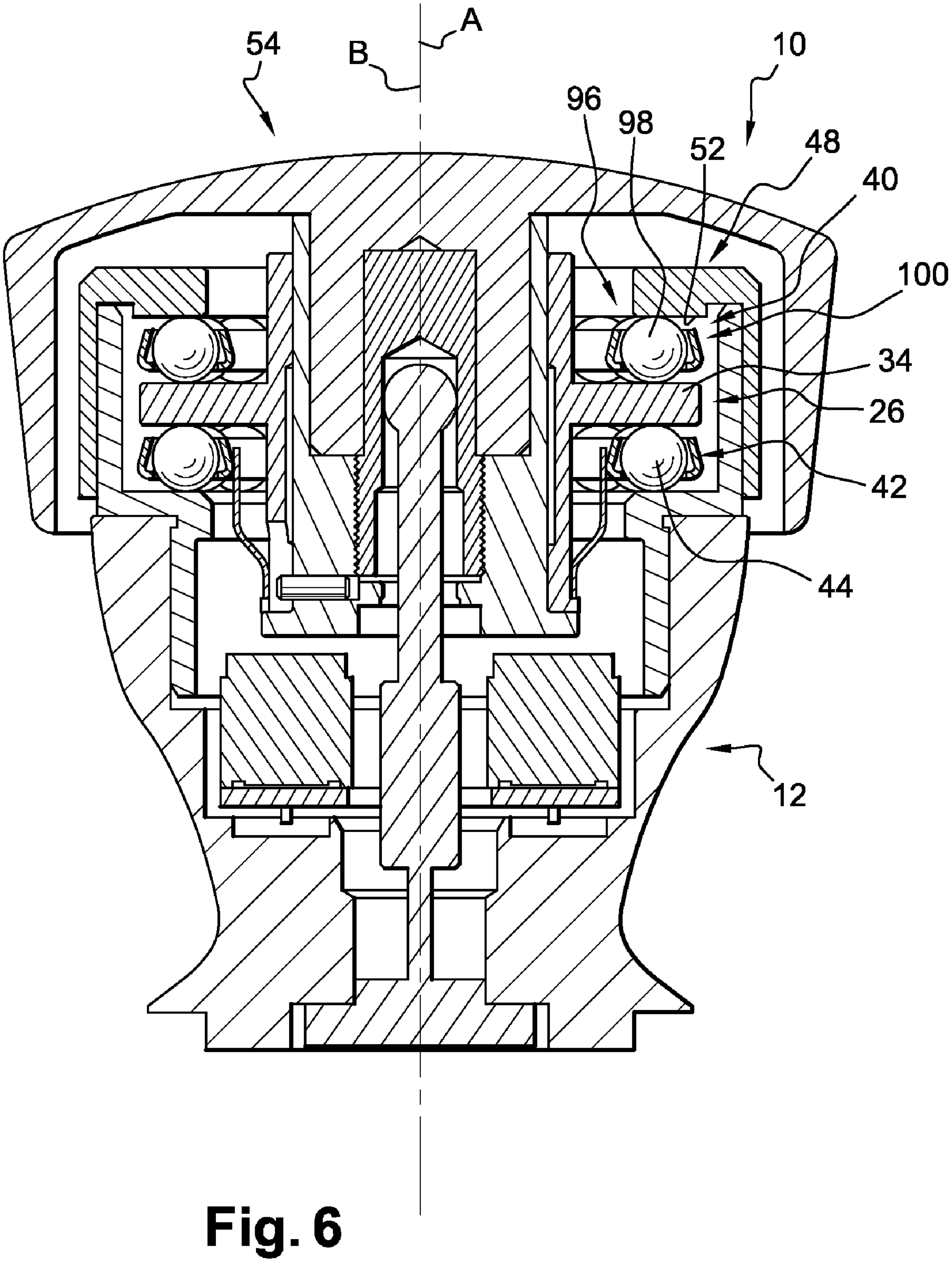
FIG. 6 is a view similar to that of FIG. 2, which illustrates an embodiment variant of the multidirectional control unit according to the invention.

According to a second embodiment of the multidirectional control unit 10, represented in FIG. 6, the radial displacement guidance means 40 of the intermediate part 26 may include a second upper set 96 of any number of balls 98 which is arranged symmetrically in a radial plane relative to the first set 42 of balls 44. Each ball 98 is axially inserted between the top radial face 34 of the intermediate part 26 and the bottom radial face 52 of the capsule 48. The balls 98 of the second set 96 are mounted to rotate in a second circular cage 100 and they are in this case annularly distributed regularly about the secondary axis B.

According to a third embodiment, not represented, the multidirectional control unit 10 may include an annular protection seal protecting the two electrical switches 92*a*, 92*b*. The protection seal includes a portion that is cylindrical (or other shaped) on the main axis A which is mounted to slide axially into a cylindrical (or other shaped) housing complementing the body 12 and includes an annular radial portion which is passed through by the bar 82 and which is supported by the top face of each electrical switch 92*a*, 92*b*. Thus, the radial portion of the protection seal may be axially inserted between the lower axial face 94 of the collar 70 and the electrical switches 92*a*, 92*b*. Advantageously, a top radial face of the protection seal may include an annular groove to retain polluting elements such as oil.

According to a fourth embodiment, not represented, the multidirectional control unit 10 may include a means of detecting the rotation movement of the handle 54. This detection means may be, for example, a sensor of the Hall-effect type, or an optical sensor, which can produce a signal representative of the angular or rotation movement of the handle 54 about the secondary axis B. This signal may be transmitted to the processing device to, for example, control a function for adjusting the speed of movement of the bed, or any other function. Advantageously, the parts of the multidirectional control unit 10 may be made of metal, particularly the lower body 12 and the assembly formed by the handle 54 and the intermediate guidance part 26, which makes the multidirectional control unit impact-resistant.

In practice, for example in the case of accidental striking of the handle 54, the impact may be absorbed by the radial plate 30 of the intermediate part 26 and the internal concave cylindrical axial end-stop wall 47 of the seat 18, which prevents the bar 82 from being damaged.

The invention claimed is:

1. A multidirectional control unit comprising:

a lower body of main axis A;

an intermediate part which is mounted to move relative to the body in a radial plane;

a radial displacement guidance means for the intermediate part, which cooperates with a first bottom radial face of the intermediate part and a second top radial face of the body;

a handle of secondary axis B, which is supported by the intermediate part and which is linked to the intermediate part in radial displacement, between a neutral central position in which the secondary axis of the handle extends roughly coaxially with the main axis of the body, and a plurality of radial actuation positions, in each of which the secondary axis B of the handle and the main axis A of the body are parallel and radially offset from each other, the handle being mounted to slide axially on the secondary axis B, between a top idle axial position towards which the handle is elastically returned and a bottom active axial position;

at least one electrical switch which is able to change state when the handle is displaced towards its bottom active axial position;

an elastically deformable bar which extends axially from the body, which comprises a top head cooperating with the handle, and which supports at least one strain gauge, such that the bar is able to bend when the handle is driven in radial displacement for said at least one gauge to produce an electrical signal representative of said radial displacement of the handle, wherein the handle is mounted to rotate freely, about the secondary axis B, relative to the body of the multidirectional control unit.

2. The multidirectional control unit of claim 1, wherein the handle is linked to rotate with the intermediate part, and in that the radial displacement guidance means of the intermediate part are able to guide the handle in rotation, about the secondary axis B.

3. The multidirectional control unit of claim 1, wherein the radial displacement guidance means comprises at least one first set of balls, of which each ball is axially inserted between the first bottom radial face of the intermediate part and the second top radial face of the body.

4. The multidirectional control unit of claim 3, wherein the radial displacement guidance means comprises a first circular cage in which the balls of the first set are fitted to rotate and distributed angularly about the secondary axis B of the handle.

5. The multidirectional control unit of claim 1, further comprising a means of returning the guidance means to a centered position, on the secondary axis B of the handle.

6. The multidirectional control unit of claim 1, wherein the intermediate part comprises an annular radial plate which is axially delimited by said first bottom radial face of the intermediate part and by a third top radial face, and in that the radial displacement guidance means comprises a second set of balls, each ball being axially inserted between said third top radial face of the intermediate part and a fourth bottom radial face of the body.

7. The multidirectional control unit of claim 1, wherein the body further comprises an internal concave cylindrical axial end-stop wall which is arranged facing a convex cylindrical axial wall of the intermediate part, so as to limit the radial displacement of the handle relative to the body.

8. The multidirectional control unit of claim 1, characterized in that the switch is supported by the body of the multidirectional control unit.

9. The multidirectional control unit of claim 1, wherein the head of the bar is received by sliding axially into a cylindrical housing which extends axially on the secondary axis B of the handle.

* * * * *